United States Patent
Doegel et al.

(10) Patent No.: US 9,316,299 B2
(45) Date of Patent: *Apr. 19, 2016

(54) HYDRODYNAMIC COUPLING DEVICE, IN PARTICULAR A TORQUE CONVERTER

(75) Inventors: Thomas Doegel, Bad Kissingen (DE); Michael Kühner, Heilbronn (DE); Ingrid Hoffelner, Knetzgau (DE); Mathias Kopp, Bamberg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 478 days.

This patent is subject to a terminal disclaimer.

(21) Appl. No.: 13/699,968

(22) PCT Filed: Dec. 3, 2010

(86) PCT No.: PCT/EP2010/068821
§ 371 (c)(1),
(2), (4) Date: Nov. 26, 2012

(87) PCT Pub. No.: WO2011/147486
PCT Pub. Date: Dec. 1, 2011

(65) Prior Publication Data
US 2013/0068580 A1    Mar. 21, 2013

(30) Foreign Application Priority Data
May 25, 2010 (DE) .......................... 10 2010 029 255

(51) Int. Cl.
| | | |
|---|---|---|
| F16H 47/08 | (2006.01) |
| F16H 35/00 | (2006.01) |
| F16F 15/14 | (2006.01) |
| F16H 45/02 | (2006.01) |
| F16D 47/06 | (2006.01) |
| F16F 15/131 | (2006.01) |
| F16H 57/00 | (2012.01) |
| F16D 13/38 | (2006.01) |
| F16D 33/18 | (2006.01) |
| H02K 5/24 | (2006.01) |
| H02K 7/00 | (2006.01) |

(52) U.S. Cl.
CPC ................ *F16H 35/00* (2013.01); *F16D 13/38* (2013.01); *F16D 33/18* (2013.01); *F16D 47/06* (2013.01); *F16F 15/131* (2013.01); *F16F 15/13157* (2013.01); *F16F 15/14* (2013.01); *F16F 15/1478* (2013.01); *F16H 45/02* (2013.01); *F16H 47/08* (2013.01); *F16H 57/0006* (2013.01); *H02K 5/24* (2013.01); *H02K 7/006* (2013.01); *F16H 2045/021* (2013.01); *F16H 2045/0205* (2013.01); *F16H 2045/0268* (2013.01)

(58) Field of Classification Search
USPC ...................................................... 475/36, 53
See application file for complete search history.

(56) References Cited

U.S. PATENT DOCUMENTS

| | | | |
|---|---|---|---|
| 6,244,401 B1 * | 6/2001 | Maienschein et al. | 192/3.3 |
| 8,939,860 B2 * | 1/2015 | Dogel et al. | 475/36 |
| 2002/0033310 A1 * | 3/2002 | Sasse et al. | 192/3.29 |

*Primary Examiner* — Erin D Bishop
(74) *Attorney, Agent, or Firm* — Cozen O'Connor

(57) ABSTRACT

A hydrodynamic coupling arrangement, particularly torque converter, includes a housing arrangement which is filled or fillable with fluid, an impeller, a turbine, a lockup clutch, a torsional vibration damping arrangement with an input region and an output region, wherein a first torque transmission path and parallel thereto a second torque transmission path and a coupling arrangement for superposing the torques transmitted via the torque transmission paths are provided between the input region and the output region. The torsional vibration damping arrangement further includes at least in the first torque transmission path a phase shifter arrangement for generating a phase shift of rotational irregularities transmitted via the first torque transmission path relative to rotational irregularities transmitted via the second torque transmission path.

20 Claims, 7 Drawing Sheets

Fig. 6
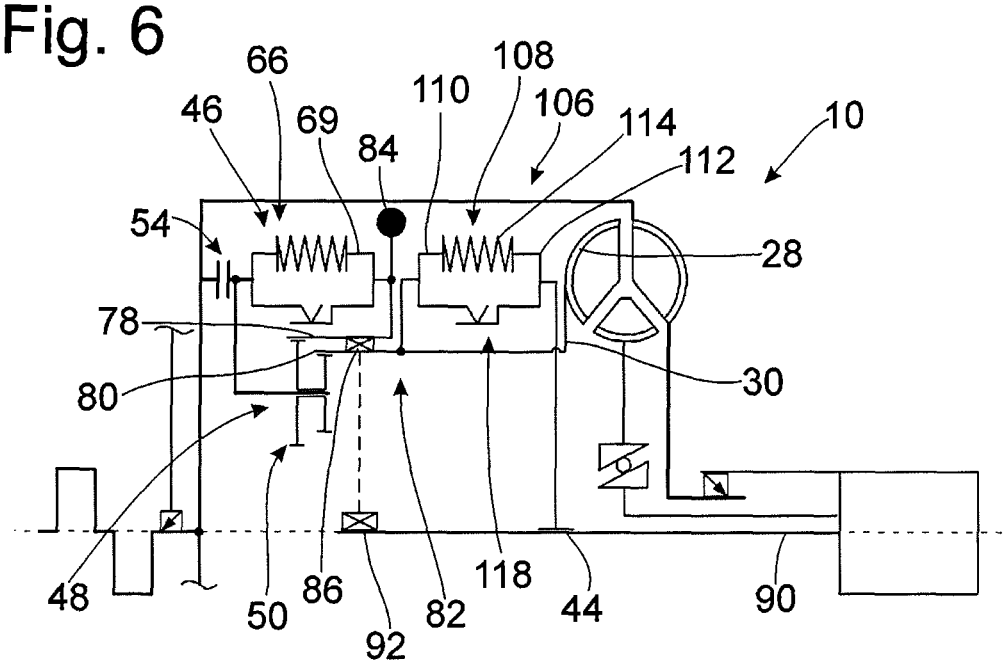
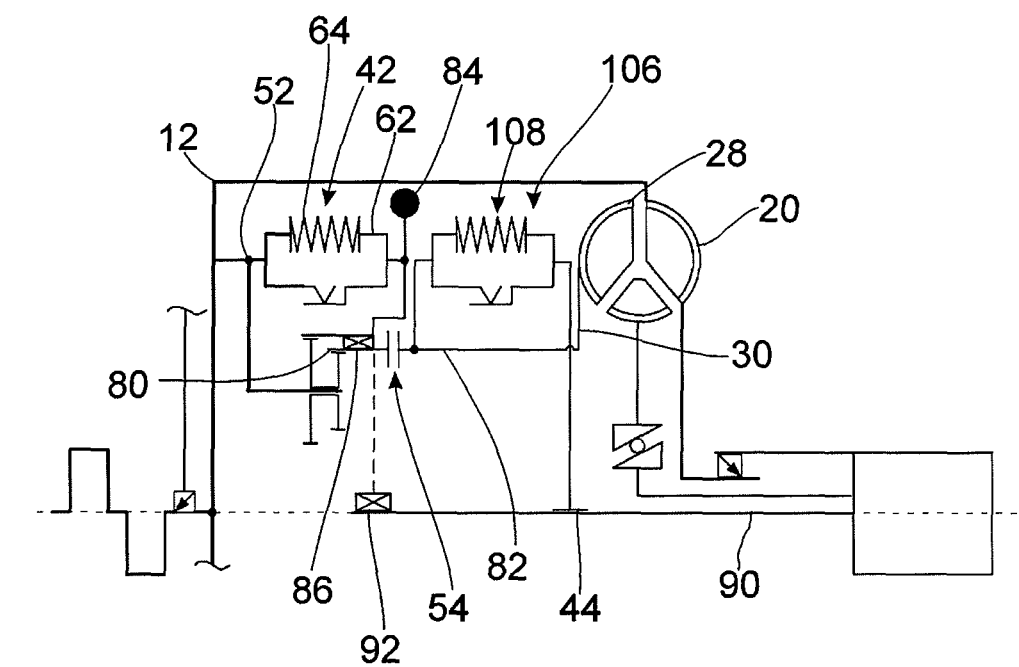
Fig. 7

HYDRODYNAMIC COUPLING DEVICE, IN PARTICULAR A TORQUE CONVERTER

PRIORITY CLAIM

This is a U.S. national stage of Application No. PCT/EP2010/068821, filed on 3 Dec. 2010, which claims priority to German Application No. 10 2010 029 255.9, filed 25 May 2010, the contents of which are incorporated herein by reference.

BACKGROUND OF THE INVENTION

1. Field of the Invention

The present invention is directed to a hydrodynamic coupling device, particularly a hydrodynamic torque converter, such as can be used, for example, in the drivetrain of a vehicle.

2. Description of the Related Art

Especially in drivetrains constructed with internal combustion engines, a constant torque can generally not be introduced into a drivetrain because periodic ignitions occur in the internal combustion engines and the energy released as a result is converted into a rotational movement of the crankshaft. The torque delivered by the crankshaft and the rotational speed thereof are both subject to fluctuations and oscillations or, generally speaking, rotational irregularities. Because rotational irregularities of this type may be noticeable in driving mode, a general objective is to eliminate these rotational irregularities as far as possible.

For example, it is known in torque converters to use energy accumulators or energy storages, i.e., springs or moving masses or combinations thereof, to temporarily store the energy occurring in rotational irregularities of the kind mentioned above and then to guide it into the drivetrain in such a way that a smoother speed characteristic or torque characteristic can be achieved. So-called turbine torsional vibration dampers and two-damper converters are examples of this. Mass pendulums known as speed-adaptive mass dampers convert the rotational irregularities occurring in driving condition into oscillating deflections of vibrating masses; the deflection is carried out in opposition to centrifugal force and, by predefining the deflection path and the masses to be deflected, it is possible to tune to particular excitation speeds or excitation frequencies. Mass dampers of this type can, of course, be combined with systems of masses which execute oscillations through the use of springs or the like.

Because of the increasingly restricted space availability in modern vehicles, there is also less installation space available for the systems used for vibration damping with consequent loss of decoupling quality, i.e., in the reduction of occurring rotational irregularities.

SUMMARY OF THE INVENTION

It is an object of the present invention to provide a hydrodynamic coupling device which achieves an improved reduction of rotational irregularities introduced into the drivetrain.

According to an embodiment of the invention, this object is met through a hydrodynamic coupling device, particularly a torque converter, comprising a housing arrangement which is filled or fillable with fluid, an impeller which is rotatable with the housing arrangement around an axis of rotation, a turbine which is arranged in the housing arrangement and which is rotatable with a driven member around the axis of rotation, a lockup clutch for producing a torque transmission connection between the housing arrangement and the driven member, and a torsional vibration damping arrangement with an input region and an output region. A first torque transmission path and parallel thereto a second torque transmission path and a coupling arrangement for superposing the torques transmitted via the torque transmission paths are provided between the input region and the output region. The torsional vibration damping arrangement further includes at least in the first torque transmission path a phase shifter arrangement for generating a phase shift of rotational irregularities transmitted via the first torque transmission path relative to rotational irregularities transmitted via the second torque transmission path.

In the torsional vibration damping arrangement according to the invention, it is ensured through the use of the phase shifter arrangement that a destructive superposition of oscillation components occurs in the torque to be transmitted in that the transmitted torque is first divided and then recombined by the phase shift that is introduced. Ideally, the rotational irregularities are virtually completely eliminated at least in a particularly critical frequency range.

In order that this phase shift can be achieved efficiently in a structurally simple manner, it is suggested that the phase shifter arrangement includes an oscillation system having a primary side and a secondary side which is rotatable relative to the primary side around the axis of rotation against the force of a spring arrangement.

The phase shifter arrangement is accordingly constructed substantially on the basis of the operating principle of a dual-mass oscillator in which two masses, i.e., essentially the primary side and secondary side, oscillating relative to one another against the action of the spring arrangement are provided with a desired oscillation behavior through selection of spring stiffness on the one hand and of mass ratios and mass inertia at the primary side and secondary side on the other hand. An oscillation system of this kind characteristically has a resonant frequency. In the frequency range below the resonant frequency, an oscillation system of this kind exhibits subcritical oscillations, i.e., excitation and reaction of the system occur substantially simultaneously. When the resonant frequency is exceeded, a phase shift occurs so that excitation and reaction occur substantially out of phase with one another and the system accordingly operates supercritically. This phase shift which ideally has a maximum value of 180° is made use of by the present invention to achieve the desired reduction in rotational irregularities in that the torque oscillation component that is phase-shifted in this way is superposed with the non-phase-shifted torque oscillation component.

To achieve a further improvement in vibration damping behavior in the torque transmission path to the driven member, it is suggested that the output region includes a further oscillation system with a primary side and with a secondary side which is rotatable relative to the primary side against the action of a spring arrangement.

In a further embodiment of the present invention which is particularly advantageous with respect to the mass distribution and therefore also the vibration damping behavior, it is suggested that turbine is coupled to the output region.

When it is further provided that the turbine is coupled to the primary side of the further oscillation system, the turbine functions as an intermediate mass between the two oscillation systems.

Alternatively, it may be provided that the turbine is coupled with the secondary side of the further oscillation system so that the output-side mass is generally very high.

In order to produce and cancel the direct torque transmission connection between the housing arrangement and the driven member by means of the lockup clutch, it can be provided, for example, that the lockup clutch is operatively arranged in one of the torque transmission paths, preferably in the first torque transmission path. By interrupting one of the torque transmission paths, the superposition of torque and therefore the entire torque flow through the torsional vibration damping arrangement is interrupted.

In an alternative embodiment it can be provided that the lockup clutch is operatively arranged in the output region. Accordingly, in this case the torque flow can be interrupted in a region situated between the coupling arrangement and the driven member by disengaging the lockup clutch.

In another alternative embodiment, the lockup clutch can be operatively arranged in the input region. This means that the lockup clutch is located and is operative in the torque flow in a region between the housing arrangement and that region in which the torque to be transmitted is divided between the two torque transmission paths.

In an embodiment which is very simple in terms of construction and can be realized in a compact manner, it is suggested that the coupling arrangement comprises a planetary transmission arrangement. To this end, it can be provided, for example, that the planetary transmission arrangement includes a planet gear carrier which is connected to the second torque transmission path and which has a plurality of planet gears rotatably supported thereon. It is to be noted that the planet gears can be formed as essentially circular gears, i.e., gears which are toothed around the entire circumference, or alternatively can also be formed as segmented gears.

In order that the planetary transmission arrangement and planet gears thereof can be used in a simple manner for combining the torques or torque components transmitted via the two torque transmission paths, the planetary transmission arrangement includes a first coupling gear arrangement in meshing engagement with the planet gears which is connected to the first torque transmission path and a second coupling gear arrangement in meshing engagement with the planet gears which is connected to the output region.

In this way it can be provided, for example, that the first coupling gear arrangement in connection with the planet gears and the second coupling gear arrangement in connection with the planet gears provide transmission ratios that are identical to one another. By providing substantially identical transmission ratios, the torque components of the total torque to be transmitted which are directed via the two torque transmission paths can be made substantially equal.

The torques or torque components to be transmitted via the two torque transmission paths can be influenced in such a way that they are not equal to one another in that the first coupling gear arrangement in connection with the planet gears and the second coupling gear arrangement in connection with the planet gears provide transmission ratios that differ from one another.

The first coupling gear arrangement and the second coupling gear arrangement can be constructed in each instance as a ring gear arrangement, i.e., can cooperate with the planet gears in the radially outer region thereof. Alternatively, it can be provided that the first coupling gear arrangement and the second coupling gear arrangement each comprise a sun gear arrangement.

To further influence the vibration damping behavior, the oscillation system and/or the further oscillation system include(s) at least two vibration dampers arranged in series with one another and respectively comprising a primary side and a secondary side which is rotatable relative to the primary side. Alternatively or in addition, the oscillation system and/or the further oscillation system include(s) at least two vibration dampers acting in parallel with one another and respectively comprising a primary side and a secondary side which is rotatable relative to the primary side.

When the oscillation system and/or the further oscillation system comprise(s) a speed-adaptive vibration damping arrangement having at least one deflection mass which can be deflected in circumferential direction from a basic position and which in so doing changes its distance from the axis of rotation, it is further possible to adapt the vibration damping behavior in the hydrodynamic coupling device constructed according to the invention to specific excitation frequencies and orders thereof.

In an alternative embodiment, this can be achieved in that the oscillation system and/or the further oscillation system include(s) a fixed-frequency vibration damping arrangement having at least one oscillation mass which can be deflected against the action of a return spring arrangement.

Further, the vibration damping behavior can be influenced in an advantageous manner in that a friction damping arrangement is associated with the oscillation system and/or with the further oscillation system, which friction damping arrangement opposes a relative rotation between primary side and secondary side thereof.

BRIEF DESCRIPTION OF THE DRAWINGS

The present invention will be described in detail in the following with reference to the accompanying drawings.

FIG. 6 is another view corresponding to FIG. 1 of an alternative embodiment.

FIG. 7 is another view corresponding to FIG. 1 of an alternative embodiment.

DETAILED DESCRIPTION OF THE PREFERRED EMBODIMENTS

Figure 1:
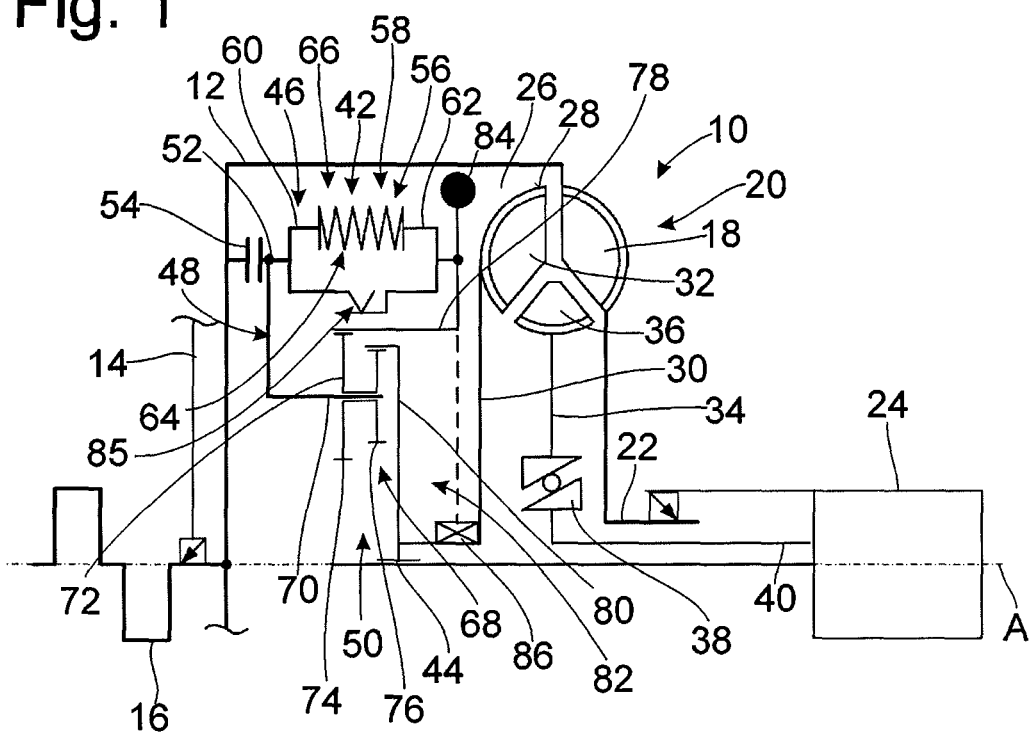
FIG. 1 is a schematic fragmentary longitudinal sectional view through a hydrodynamic coupling device having a torsional vibration damping arrangement.

A hydrodynamic coupling device 10 in the form of a hydrodynamic torque converter is realized in FIG. 1. The coupling device 10 comprises a housing 12 which is coupled to a drive unit, for example, an internal combustion engine 14, indicated schematically, and the crankshaft 16 thereof, and is accordingly rotatable around an axis of rotation A. Impeller blades 18 are provided successively in circumferential direction at an inner side of the housing 12 so as to provide an impeller 20 which is rotatable with the housing 12 around the axis of rotation A. An impeller hub 22 provided by the housing 12 is positioned so as to engage in a transmission 24 and in rotational operation of the housing 12 can drive a fluid pump or oil pump provided in the transmission 24.

A turbine, designated generally by 28, is arranged in the interior 26 of the housing 12. This turbine 29 includes a turbine shell 30 and a plurality of turbine blades 32 which are supported thereon axially opposed to the impeller blades 18. A stator 34 including the stator blades 36 thereof is arranged axially between the impeller 20 and the turbine 28. The stator 34 is carried on a hollow supporting shaft 40 via a freewheel arrangement 38 so as to be rotatable in one direction around the axis of rotation A.

A torsional vibration damping arrangement, designated generally by 42, is provided in the interior 26. This torsional vibration damping arrangement 42 lies in the torque transmission path between the housing 12 and a driven member 44, for example, a turbine hub. The torsional vibration damping arrangement serves to divide the torque that is received by the housing 12 and transmitted to the driven member 44 into two torque transmission paths 46, 48 and, through combination of the torque components transmitted via the two torque transmission paths 46, 48 at a coupling arrangement 50, to reduce or ideally completely eliminate rotational irregularities, i.e., for example, torque oscillations or fluctuations.

The torsional vibration damping arrangement 42 includes an input region 52 which receives via a lockup clutch 54 the torque introduced into the housing 12. This lockup clutch 54 is accordingly associated with the input region 52 of the torsional vibration damping arrangement 42 and acts between the latter and the housing arrangement 12. It is to be noted that the lockup clutch 54 can be constructed, in a manner known per se, with a clutch piston which can be pressed either directly against the housing 12 or against annular disk-shaped friction elements which can be brought into frictional interaction with one another.

The two torque transmission paths 46, 48 branch out in the input region 52. The first torque transmission path 46 thereof comprises a phase shifter arrangement 56 which causes the torque transmitted via this first torque transmission path 46 to undergo a phase shift relative to the torque transmitted via the second torque transmission path 48.

The phase shifter arrangement 56 includes a torsional vibration damper 58 having a primary side 60, a secondary side 62 and a spring unit 64 which opposes a relative rotation between the primary side 60 and the secondary side 62. It is to be noted that the torsional vibration damper 58 can be constructed in a conventional manner and, for example, can comprise as primary side a hub disk and as secondary side two cover disk elements which are disposed on either side thereof and which are fixedly connected to one another. The spring unit 64 can have a plurality of springs, preferably helical compression springs, which are disposed successively in circumferential direction and which, being supported at the primary side 60 and secondary side 62, cause a restoring force thereof with respect to one another in direction of a neutral relative rotational position. Accordingly, in the embodiment example shown in FIG. 1, the torsional vibration damper 58 substantially provides an oscillation system 66 which leads in the first torque transmission path 46 to a phase shift of rotational irregularities or torque oscillations transmitted via this first torque transmission path 46. This oscillation system 66 has a natural frequency or resonant frequency as a result of the masses present at the primary side and secondary side 62 and the spring unit 64 of the torsional vibration damper 58 which provides the spring arrangement of the oscillation system 66 in this case. When vibrations are excited below this natural frequency, vibrations which are to be transmitted are transmitted substantially without a phase shift. When the resonant frequency is exceeded, a phase shift occurs which can ideally amount to at most 180° so that exciting vibrations and transmitted vibrations are out of phase with one another.

The torques or torque components transmitted via the two torque transmission paths 46, 48 are combined again in the coupling arrangement 50. To this end, the coupling arrangement 50 is constructed as a planetary transmission arrangement 68 and comprises a planet gear carrier 70 coupled to the second torque transmission path 48. This planet gear carrier 70 carries a plurality of planet gears 72 distributed in circumferential direction. These planet gears 72 have two sets of teeth 74, 76 which are axially offset with respect to one another and which in the embodiment shown in FIG. 1 have diameters which differ from one another with respect to the rotational axes of the planet gears 72 at the planet gear carrier 70.

A first ring gear 78 is connected to the secondary side 62 of the torsional vibration damper 58 and oscillation system 66, respectively, and is in meshing engagement with the teeth 74 of the planet gears 72. A second ring gear 80 which substantially also provides an output region 82 of the torsional vibration damping arrangement 46 is in a toothed engagement with the teeth 76 of the planet gears 72.

Through cooperation of the planet gears 72 with the two ring gears 78, 80, these planet gears 72 being carried on the planet gear carrier 70 so as to be basically freely rotatable, the planetary transmission arrangement 68 causes the torques transmitted via the two torque transmission paths 46, 48 to be combined. When these torques contain oscillation components and if the frequency of these oscillation components or fluctuation components is below the resonant frequency of the oscillation system 66, the two torques or torque components are combined and superposed in phase in the coupling arrangement 50. The torque transmitted into the output region 82 accordingly also approximately corresponds with respect to its fluctuation characteristic to the torque received in the input region 52 of the lockup clutch 54.

However, if the frequency of the oscillation component lies above the resonant frequency of the oscillation system 66, i.e., of the torsional vibration damper 58 in this instance, the two torques transmitted with their oscillation components via the torque transmission paths 46, 48 are destructively superposed in the coupling arrangement 50. Ideally, i.e., with a phase shift of 180°, the oscillation components can be completely eliminated so that the torque received at the output region 82 has a substantially smooth characteristic or at least a characteristic with appreciably reduced oscillation.

To further influence the damping behavior of the torsional vibration damping arrangement 42, a supplementary mass 84 can be associated, for example, with the secondary side 62 so as to increase the mass on the secondary side and therefore exert an influence on the resonant frequency. Further, a friction damping arrangement, designated generally by 85, can be associated with the oscillation system 66, which friction damping arrangement 85, for example, can act parallel to the spring unit 64 between the primary side 60 and the secondary side 62 and can be configured as a Coulomb friction device or as a fluid friction device. Providing a friction damping arrangement 85 of this type acting in parallel with the spring unit 64 also substantially influences the magnitude of the phase shift introduced by the oscillation system 66.

It will further be seen in FIG. 1 that the turbine 28 is coupled to the output region 82 of the torsional vibration damping arrangement 42 and, therefore, basically does not influence the mass ratios in the oscillation system 66 even before the two torques transmitted via the torque transmission paths 46, 48 are superposed in the coupling arrangement 50.

The secondary side 62 and the ring gear 78 coupled with the latter can be supported, for example, by a bearing 86 at the output region 82 and turbine shell 30.

The configuration of the torsional vibration damper 58, i.e., the mass at the primary side 60, the mass at the secondary side 62, the stiffness of the spring unit 64, and the supplementary mass 84 reinforcing the secondary-side mass generally aims for the lowest possible natural frequency of the oscillation system 66 in order to achieve the transition to the supercritical operating condition, i.e., the operating condition working with phase shift, already at comparatively low excitations of oscillation, i.e., already at a comparatively low rotational speed.

Due to the fact that the two sets of teeth 74, 76, and therefore also the two ring gears 78, 80, have different diameters, it is possible to exert an influence on the distribution of torques to the two torque transmission paths 48, 48. The closer the diameters of the ring gears 78, 80 to one another, and therefore the closer the diameters of the sets of teeth 74, 76 to one another, the more uniform the components of the torques transmitted via the two torque transmission paths 46, 48. In the embodiment example shown in FIG. 1 in which the teeth 74 cooperating with the ring gear 78 have a greater diameter, a transmission ratio below 1 is achieved; with the reverse size ratio, a transmission ratio above 1 is achieved. In the former case, the torque transmitted via the first torque transmission path 46 is increased by making use of a torque flow reversal in the second torque transmission path 48, namely, by supporting at the coupling arrangement 50. In this case also, within the meaning of the invention, a destructive superposition of the two torque flows in the torque transmission paths is used to obtain a substantially smoother total torque at the output region 82. In the latter case, i.e., when teeth 76 are larger and teeth 74 are smaller, the torque introduced at the input region 52 is divided corresponding to the size ratios in such a way that a torque flow is carried out in the same direction in both torque transmission paths 46, 48 and the two torque components guided in the same direction are superposed on one another in the coupling device 50.

Figure 2:
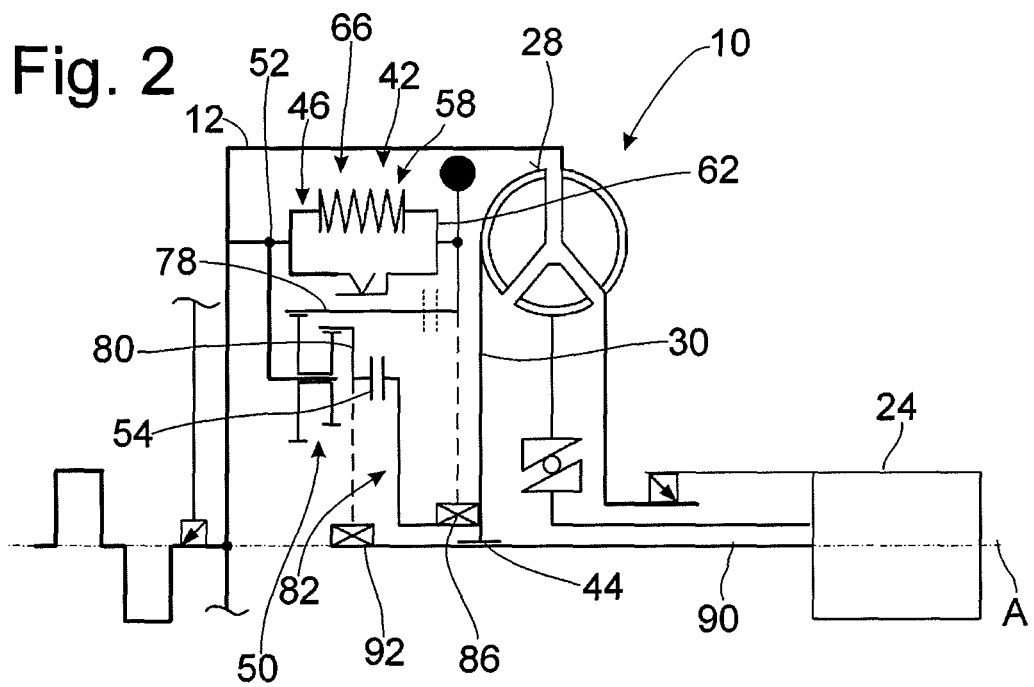
FIG. 2 is a view corresponding to FIG. 1 of an alternative embodiment.

An alternative embodiment of the coupling device 10 is shown in FIG. 2. In the following, only the differences presented by this embodiment form with respect to the embodiment form described above will be addressed.

In the embodiment form shown in FIG. 2, the lockup clutch 54 is associated with the output region 82 of the torsional vibration damping arrangement 42, i.e., it is situated in the torque transmission path between the ring gear 80 and the driven member 44. The turbine 28 is connected by its turbine shell 30 directly to the driven member 44 and therefore to an input shaft 90 of the transmission 24 for rotation in common around the axis of rotation A. The secondary side 62 of the oscillation system 66 and torsional vibration damper 58, respectively, is supported by the bearing 86 on the output region 82 at an output side of the lockup clutch 54. The ring gear 80 which is likewise to be associated with the output region can be supported by an additional bearing 92 together with the input side of the lockup clutch 54, for example, with respect to the transmission input shaft 90.

In a variation of this embodiment, the lockup clutch 54 can also be arranged in front of the coupling device 50, i.e., in the first torque transmission path 46, as is indicated by dotted lines. For this purpose, it is possible, for example, to divide the ring gear 78 to be associated with the first torque transmission path 46.

Figure 3:
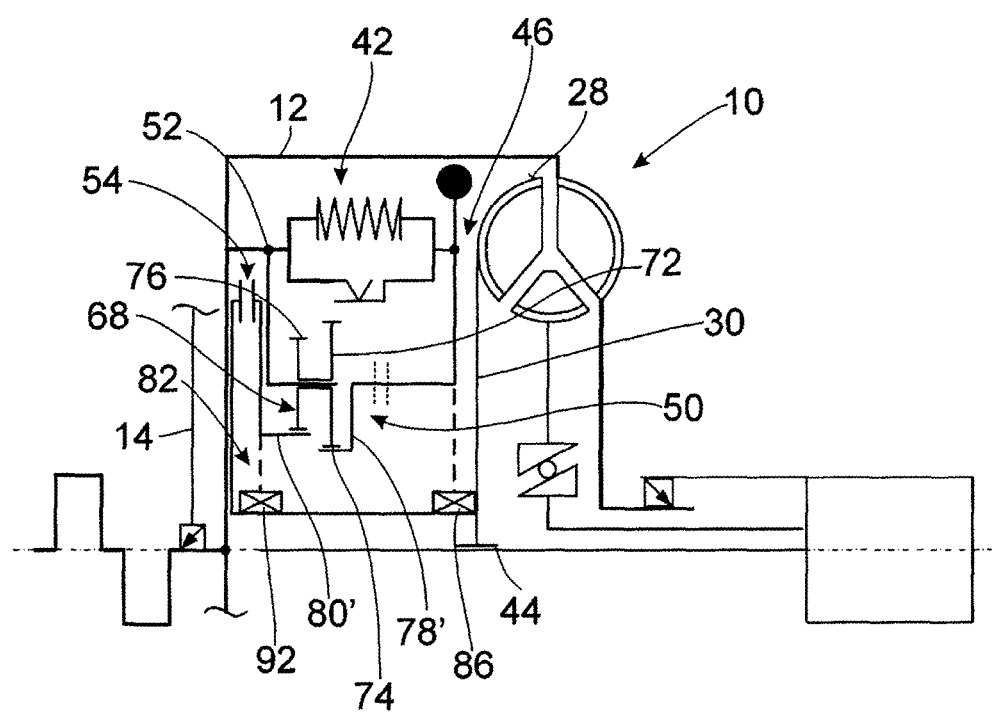
FIG. 3 is another view corresponding to FIG. 1 of an alternative embodiment.

A further embodiment is shown in FIG. 3. In this case also, similar to the embodiment variant in FIG. 2, the input region 52 of the torsional vibration damping arrangement 42 is substantially rigidly connected to the housing 12. The first torque transmission path 46 is coupled to the teeth 74 of the planet gears 72 via a sun gear 78', which teeth 74 now have the larger diameter. The output region 82 is coupled to the teeth 76 of the planet gears 72 via a sun gear 80', which teeth 76 now have the smaller diameter. The lockup clutch 54 again acts between this sun gear 80' and the driven member 44, i.e., so as to be substantially associated with the output region 82. This lockup clutch 54 can be arranged axially between the coupling arrangement 50, i.e., the planetary transmission arrangement 68, and the side of the housing 12 to be positioned facing the drive unit 14. The two sun gears 78', 80' can be supported by the two bearings 86, 92 on the output side 82 of the torsional vibration damping arrangement 42, which output side 82 is in turn fixedly coupled to the turbine 28 or turbine shell 30.

Figures 4, 5:
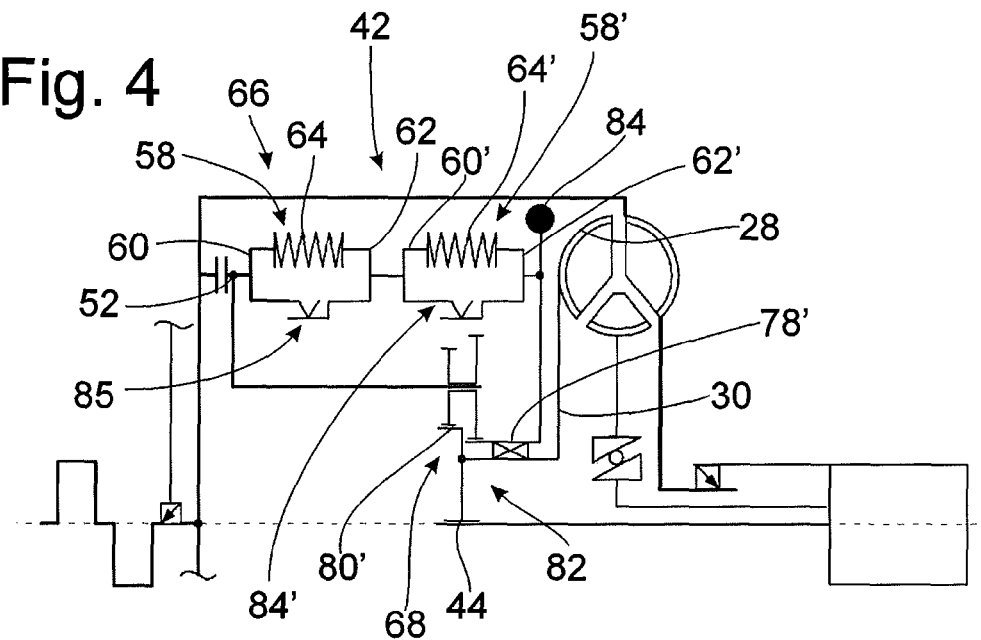
FIG. 4 is another view corresponding to FIG. 1 of an alternative embodiment.
FIG. 5 is a fragmentary longitudinal sectional view through an embodiment of the construction shown in FIG. 4.

Another embodiment is shown in FIG. 4. In this embodiment, the oscillation system 66 includes two torsional vibration dampers 58, 58' working in series. The primary side 60 of the torsional vibration damper 58 is connected to the input region 52 of the torsional vibration damping arrangement 42. The secondary side 62 of the torsional vibration damper 58 is connected to a primary side 60' of the torsional vibration damper 58'. A secondary side 62' of the torsional vibration damper 58' is coupled to the sun gear 78' of the planetary transmission arrangement 68. The turbine shell 30 of the turbine 28 is coupled to the sun gear 80', i.e., the output region 82, and is accordingly fixedly rotatably connected to the driven member 44. The two spring units 64, 64' of the two torsional vibration dampers 58, 58' in their entirety form the spring arrangement of the oscillation system 66.

It is to be noted that with respect to spatial relationship the two torsional vibration dampers 58, 58' can be arranged in axial succession as well as radially staggered with respect to one another. It is also entirely possible to allow these two torsional vibration dampers 58, 58' to act in parallel rather than in series, in which case the two primary sides 60, 60' on the one hand and the two secondary sides 62, 62' on the other hand are to be coupled to one another, respectively. It is also possible, of course, for a friction damping arrangement 85, 85' to be associated with each torsional vibration damper 58, 58'.

FIG. 5 shows a construction of the coupling device 10 of the embodiment shown in FIG. 4. The housing 12 is seen with a housing shell 94 to be positioned facing the drive unit and a housing shell 96 to be positioned facing the transmission, which housing shells 94, 96 can be connected to one another by a connecting housing element 98. The lockup clutch 54 includes a piston 100 which is axially movable by fluid pressure and a plurality of drive-side and driven-side disk-like friction elements which are fixed in a rotationally locking manner in each instance to the housing 12 on the one hand and to a friction element carrier 102 on the other hand and can be pressed against one another to produce the lockup condition. The friction element carrier 102 is to be associated with the input region 52 of the torsional vibration damping arrangement 42 and is fixedly connected to the primary side 60 of the torsional vibration damper 58, which primary side 60 is provided by two cover disk elements. On the other hand, the friction element carrier 102 is fixedly connected to the planet gear carrier 70 so that the branching into the two torque transmission paths 46, 48 substantially takes place in this region.

The secondary side 62 of the torsional vibration damper 58, which secondary side 62 is formed as central disk element or hub disk, is connected, e.g., riveted, radially inward of the spring unit 64 cooperating with this secondary side 62 and with the cover disk elements to the primary side 60' of the torsional vibration damper 58', which primary side 60' is formed as central disk element or hub disk. Situated on both sides thereof are the two cover disk elements of the secondary side 62' of the torsional vibration damper 58'. The springs of the spring unit 64' act between these cover disk elements and the central disk element of the primary side 60'.

The sun gear 78' is fixedly connected, e.g., riveted, to the right-hand cover disk element of the two cover disk elements of the secondary side 62' referring to FIG. 5. A radially outwardly extending carrier element 104 is also connected by this rivet connection to the secondary side 62' and radially outwardly carries the supplementary mass 84 in the form of one or more mass means.

The sun gear 78' is in meshing engagement with the teeth 74 of the planet gears 72. The teeth 76 of same are in meshing engagement with the sun gear 80'. The latter is connected in turn to the driven member 44 and substantially also provides the output region 82 of the torsional vibration damping arrangement 42.

In this embodiment variant, the two torsional vibration dampers 58, 58' of the vibration damper system 66 are arranged axially successively, and the springs of the two spring units 64, 64' are situated approximately on the same radial level and can be formed in each instance, for example, with springs or spring groups nested one inside the other. The lockup clutch 54 lies radially outward of the two torsional vibration dampers 58, 58'. The coupling arrangement substantially comprising the planetary transmission arrangement 68 is located axially between the transmission-side torsional vibration damper 58' and the turbine 28. The latter is fixedly connected, for example, by welding or riveting, to the driven member 44 but could also be connected to the sun gear 80'. The sun gear 80' which is connected to the driven member 44' by riveting could also be formed integral therewith.

When the lockup clutch 54 is closed, the turbine 28 which is not integrated in the two torque transmission paths of the torsional vibration damping arrangement 42 acts only to increase the mass moment of inertia of the output region 82. Accordingly, the turbine 28 substantially has no influence on the vibration damping behavior of the torsional vibration damping arrangement 42. In this respect, the mass ratios between the input region 52 and the output region 82, which are also decisively influenced by the supplementary mass 84 coupled to the sun gear 78', are particularly relevant. Of course, the spring stiffness of the spring units 64, 64' also influences the vibration damping behavior and resonant frequency of the oscillation system 66.

Owing to their radial position and construction, the torsional vibration dampers 58, 58' in this embodiment form are particularly low-friction and accordingly allow a reproducible phase transition between the subcritical and supercritical condition. At the same time, the different connection points, for example, for connecting the primary side 62 to the secondary side 60' and for connecting the secondary side 62' to the sun gear 78' or carrier element 104 or the rivet connections of the cover disk elements, can be used as means for limiting the rotational angle for the two torsional vibration dampers 58, 58'. It will further be seen that in the region of the connection of the secondary side 62 to the primary side 60' the two torsional vibration dampers 58, 58' can be supported radially with respect to the driven hub 44. In this case, the function of the axial bearing support can also be implemented at the same time. Alternatively, a bearing support directly on the transmission input shaft, not shown, would also be conceivable in this case.

It will be seen further in FIG. 5 that the rotational axes of the planet gears 72 at the planet gear carrier 70 are arranged radially outward of the spring units 64, 64', i.e., have a greater radial distance from the axis of rotation than the latter. For example, this allows a construction in which the cover disk element of the secondary side 62' which is connected to the sun gear 78' could be formed integral with this sun gear 78' and could even provide it. Of course, it is also conceivable to construct the other cover disk element of the two cover disk elements of the torsional vibration damper 58' as a sun gear 78' or to connect it to the latter and accordingly position the planet gears 72 axially between the two torsional vibration dampers 58, 58'.

FIG. 6 shows another embodiment variant of the coupling device 10 schematically. In this case, the oscillation system 66 substantially corresponds to the construction illustrated in FIG. 1. The construction of the coupling arrangement 50 and the interaction thereof with the ring gears 78, 80 also corresponds to the construction in FIG. 1. It will be seen that the turbine shell 30 is connected to the driven-side ring gear 80 or can provide the latter integrally. A substantial area of the output region 82 is also realized in this way but does not comprise a further oscillation system 106 in this embodiment example. In this case, the further oscillation system 106 is formed with a torsional vibration damper 108 with an input region 110 and an output region 112 and with a spring unit 114 acting therebetween. The input region 110 is coupled to the ring gear 80 and turbine shell 30 and therefore to the turbine 28. The output region 112 is coupled to the driven member 44. Accordingly, the torque which is received at the ring gear and which was previously transmitted via the two torque transmission paths 46, 48 is transmitted to the driven member 44 via the further oscillation system 106 and the torsional vibration damper 108 thereof.

The secondary side 62 of the oscillation system 66 and the ring gear 78 coupled thereto can be supported in this instance by the bearing 86 on the output region and ring gear 80 which can in turn be supported, for example, on the transmission input shaft 90 by bearing 92.

Accordingly, this basically shows a construction in which the turbine 28 is incorporated as intermediate mass between the two oscillation systems 66, 106. The downstream torsional vibration damper 108 of the further oscillation system 106 with respect to the torque flow acts as a so-called turbine torsional damper also when the lockup clutch 54 is disengaged, i.e., in torque converter mode, which contributes on the driven side, i.e., in the region of the driven member 44, to a comparatively low inertia. In this respect, it must be taken into account that the spring stiffness or characteristic of the spring unit 114 is to be adapted at least to the nominal torque of the driving unit, including a spread brought about, for instance, by torque fluctuations.

In order to influence the secondary-side mass of the oscillation system 66, the supplementary mass 84 can be provided again at the latter.

FIG. 7 shows a modification of the above-described construction with the further oscillation system 106. In this variant, the input region 52 of the torsional vibration damping arrangement 42 is substantially rigidly connected to the housing 12. The lockup clutch 54 is associated with the output 82 and acts, for example, between the ring gear 80 and the turbine shell 30 of the turbine 28.

When the lockup clutch 54 is disengaged, the torque flow from the input region 52 to the drive member 44 is severed. The torque is transmitted via impeller 20, turbine 28 and the further oscillation system 106 to the driven member 44 and from the latter to the transmission input shaft 90. The turbine 28 in this embodiment variant is supported and radially centered with respect to the transmission input shaft 90 by the torsional vibration damper 108 of the further oscillation system 106, which torsional vibration damper 108 acts as a turbine torsion damper.

When lockup clutch 54 is disengaged, the torsional vibration damping arrangement 42 also acts as a so-called fixed-frequency damper, particularly also by providing the supplementary mass 84 on the secondary side 62, because torsional vibrations introduced into the housing 12 can also be transmitted to the spring unit 64 via the input region 52 and therefore the supplementary mass 84 and all of the structural component parts connected to the latter can carry out a free oscillation.

Figure 8:
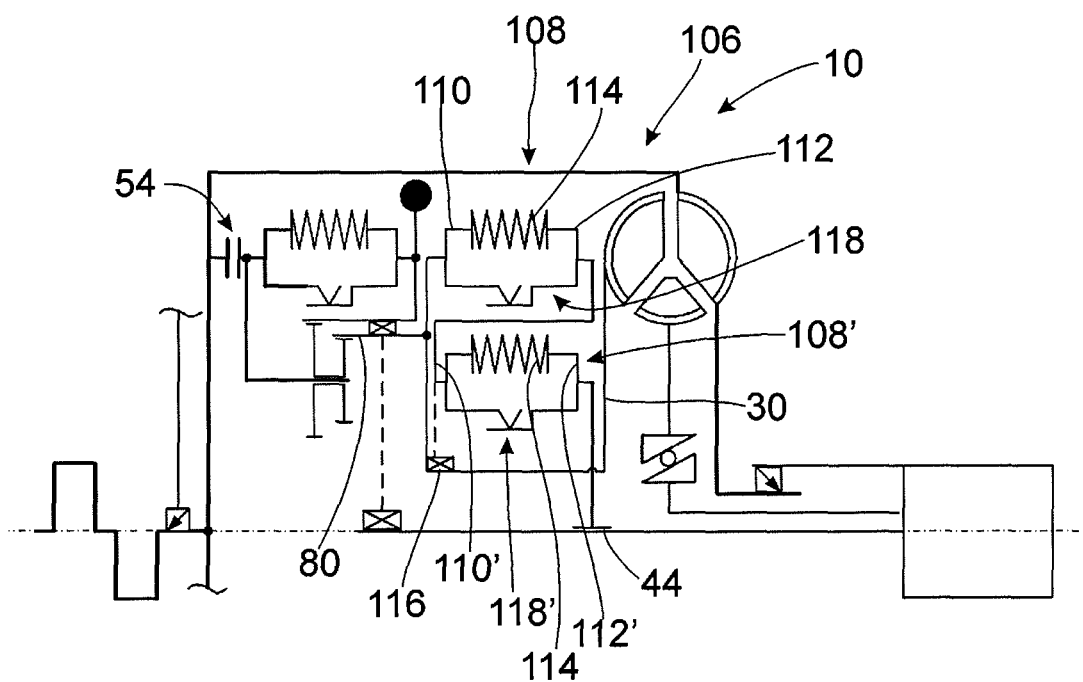
FIG. 8 is another view corresponding to FIG. 1 of an alternative embodiment.

FIG. 8 shows an embodiment in which the further oscillation system 106 includes two torsional vibration dampers 108, 108' working in series. The secondary side 112 of the torsional vibration damper 108 connected by its primary side 110 to the ring gear 80 is connected to the primary side 110' of torsional vibration damper 108'. A secondary side 112' of this torsional vibration damper 108' is connected to the driven member 44. An intermediate region of the two torsional vibration dampers 108, 108' which comprises the secondary side 112 and primary side 110 can be supported by a bearing 116 on the turbine shell 30 and ring gear 80 or on a portion connecting these two assemblies.

Of course, a friction damping arrangement 118 and 118', respectively, can be associated with each of the torsional vibration dampers 108. 108' of the further oscillation system 106. Further, it is possible that the two torsional vibration dampers 108, 108' act parallel to one another. For this purpose, the two primary sides 110, 110' and the two secondary sides 112, 112' are to be fixedly coupled to one another, respectively.

Figure 9:
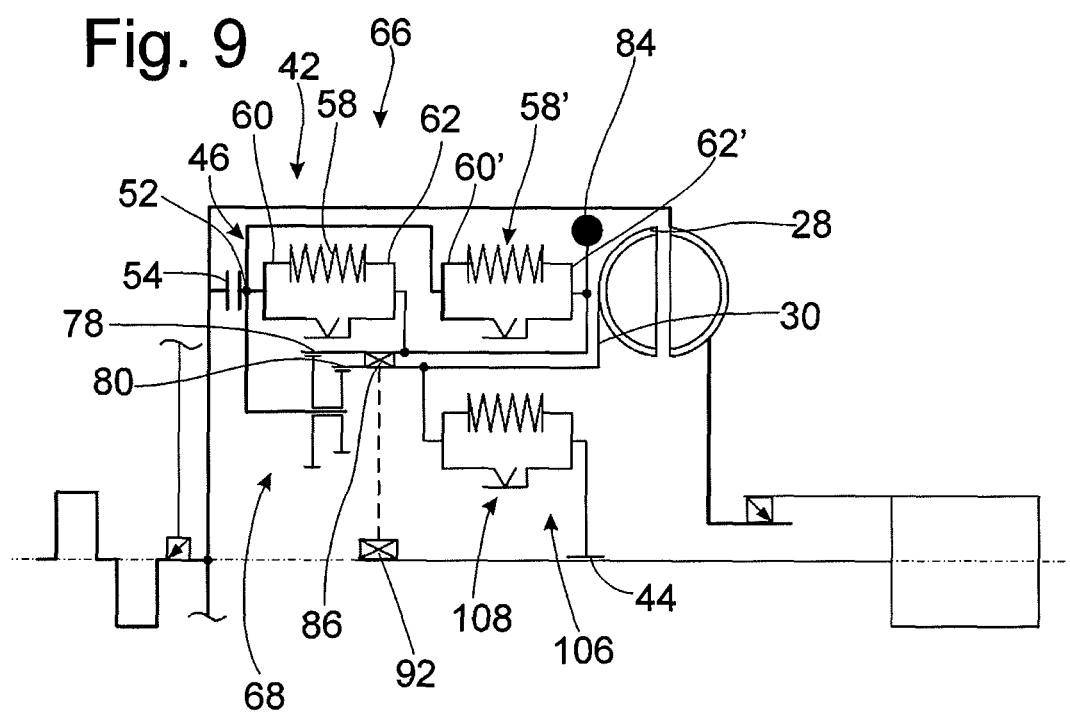
FIG. 9 is another view corresponding to FIG. 1 of an alternative embodiment.

In the embodiment variant shown in FIG. 9, the oscillation system 66 of the torsional vibration damping arrangement 42, i.e., the oscillation system acting in the first torque transmission path 46, is formed with two torsional vibration dampers 58, 58' acting in parallel. The primary sides 60, 60' thereof are respectively connected to the input region 52 or also substantially provide the latter. Their secondary sides 62, 62' are fixedly coupled to the supplementary mass 84 on one hand and to the ring gear 78 on the other hand. The ring gear 80 of the planetary transmission arrangement 68 is coupled to the turbine 28 on one hand and, via the torsional vibration damper 108 of the further oscillation system 106, to the driven member 44 on the other hand.

Figure 10:
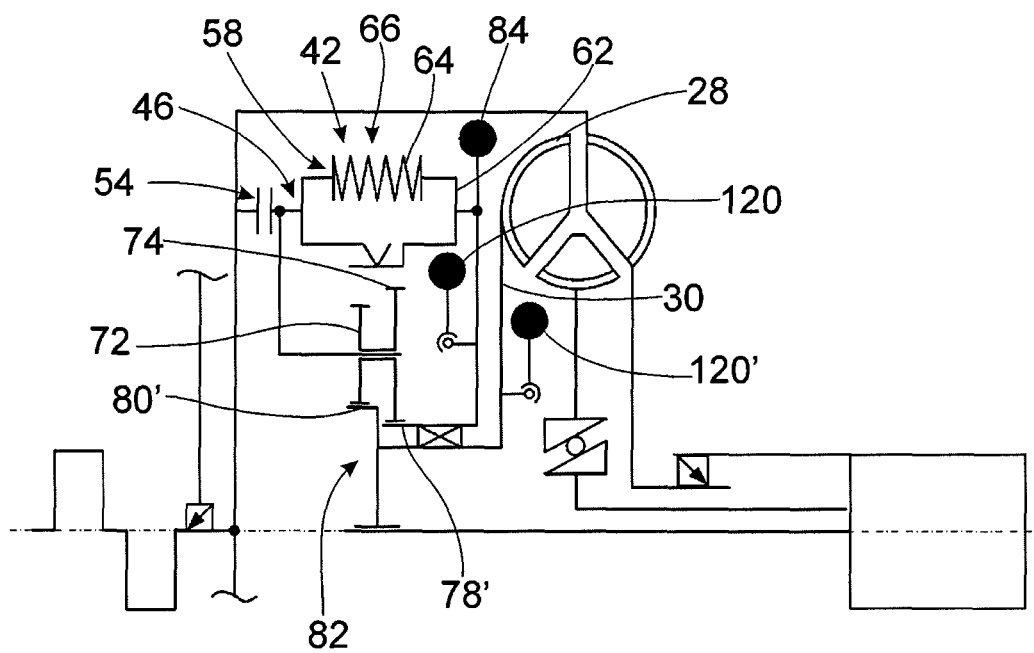
FIG. 10 is another view corresponding to FIG. 1 of an alternative embodiment.

FIG. 10 shows an embodiment variant in which the secondary side 62 of the torsional vibration damper 58 of the oscillation system 60 is coupled to the teeth 74 of the planet gears 72 by a sun gear 78'. The turbine 28 is connected by its turbine shell 30 to the output region 82 and therefore to the sun gear 80'. A vibration damping arrangement 120 not situated in the torque flow from the housing 12 to the driven member is provided in association with the secondary side 62 of the torsional vibration damper 58, i.e., also in association with the first torque transmission path 46. This vibration damping arrangement 120 can comprise, for example, a substantially freely oscillating mass arrangement which can be deflected against the restoring force of a spring arrangement, i.e., can act as a fixed-frequency damper. The vibration damping arrangement 120 can also be constructed so as to act in a speed-adaptive manner with one or more masses guided along deflection paths. The deflection paths are curved radially inward, i.e., they have a vertex region. Depending upon centrifugal force, the masses to be deflected are positioned in this vertex region. In the event of rotational irregularities, there is a deflection out of the vertex region and, due to the curved construction of the guide paths, the deflection masses are moved radially inward and absorb potential energy.

Alternatively or in addition, a vibration damping arrangement 120' of this kind which acts as a fixed-frequency damper or is speed-adaptive can also be associated with the output region 82.

It is to be noted that when rotational fluctuations are transmitted to the turbine 28 when the lockup clutch 54 is disengaged, i.e., in torque converter mode, the supplementary mass 84 which is supported via the spring unit 64 of the torsional vibration damper 58 can also oscillate freely and accordingly can also act like a fixed-frequency vibration damping arrangement.

Figure 11:
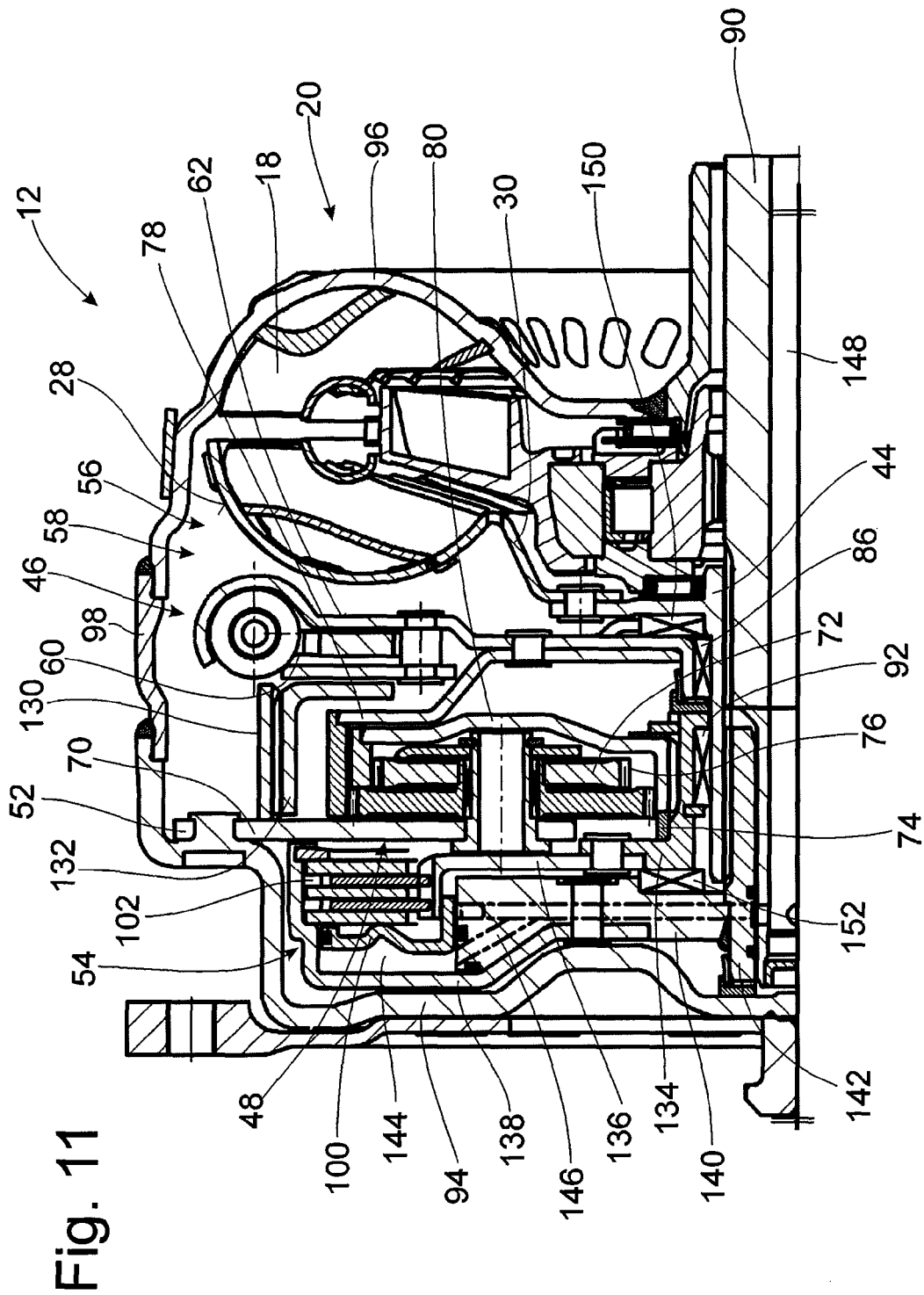
FIG. 11 is a fragmentary longitudinal sectional view through an embodiment of the construction shown in FIG. 2.

FIG. 11 shows a construction of a coupling device 10 such as that shown schematically in FIG. 2. In the coupling device shown in FIG. 11, the planet gear carrier 70 is fastened to the engine-side housing shell 94, for example, by riveting, in the radially outer region thereof and also provides the input region 52 in this area. The planet, gears 72 which are again formed in a stepped manner are rotatably supported at the planet gear carrier 70 in the radially inner region thereof. In the radially outer region, an annular toothed element 130 is fixedly connected to the planet gear carrier 70, for example, by welding. This annular toothed element 130 engages in a rotationally coupling manner with a mating toothed element 132 which is in turn fixedly connected by riveting or the like to the primary side 60 of the torsional vibration damper 58, which primary side 60 is constructed, for example, in the form of a central disk element or a hub disk. The toothed element 130 could also be connected directly to the housing 12 or could be provided by the latter. The secondary side 62 of the torsional vibration damper 58 comprises two cover disk elements. These cover disk elements are fixedly connected to one another by riveting. The ring gear 78 which is formed of multiple parts in this case is fixedly connected to one of these cover disk elements by riveting or the like and is in meshing engagement with the teeth 74 of the planet gears 72. The ring gear 80 which is likewise formed of multiple parts in this case and which is in meshing engagement with the teeth 76 of the planet gears 72 is coupled, splined or the like, in its radially inner region to a transmission element 134 so as to be fixed with respect to rotation relative to it. This transmission element 134 is in turn connected by riveting to an input-side friction element carrier 136 of the lockup clutch 54 so as to be fixed with respect to rotation relative to it. An output-side friction element carrier 138 which in this case is also formed as an outer disk carrier at the same time is fixedly connected to a further transmission element 140 by riveting. In its radially inner region, the transmission element 140 is fixedly connected, for example, by welding, to another transmission element 142 which has a generally cylindrical structure and is provided with external teeth. This transmission element 142 engages by its external teeth in a rotationally coupling manner with internal teeth of the driven member 44, which internal teeth, axially adjoining the transmission element 142, are in meshing engagement with external teeth of the transmission input shaft 90. The turbine shell 30 of the turbine 28 is fixedly connected by riveting to the driven member 44 or to a radially outwardly extending flange-like region thereof.

When the lockup clutch 54 is disengaged, a torque is transmitted to the turbine 28 by hydrodynamic interaction between the impeller 20 and the turbine 28 and, via the substantially rigid coupling thereof to the transmission input shaft 90, is transmitted to the latter. In the engaged state of the lockup clutch, i.e., a condition in which the friction elements or disks 102, which are fixed in a rotationally locking manner to the drive-side friction element carrier 136, and the friction elements or disks 102, which are fixed in a rotationally locking manner to the driven-side friction element carrier 138, are pressed against one another by the clutch piston 100, the turbine 28 increases the mass moment of inertia of the transmission input shaft 90 but has a subordinate importance with respect to vibration damping functionality. In this case, the configuration of the mass ratios in the two torque transmission paths 46 and 48 has a greater importance. The torque which is branched off at the planet gear carrier 70 is transmitted via the torsional vibration damper 58 of the phase shifter arrangement 56 on the one hand and is transmitted via the planet gear carrier 70 and the planet gears 72 on the other hand and is combined again by its interaction with the two ring gears 78, 80 and transmitted to transmission element 134, friction element carrier 138, transmission elements 140, 142 and driven member 44 into the transmission input shaft 90.

To achieve this engaged state of the lockup clutch 54, a volume region 144 which is to be filled with compressed fluid and which can be supplied from the radially inner side via channels 146 in the transmission element 140 is formed by friction element carrier 138 and transmission element 140 in cooperation with the clutch piston 100 which is axially movably guided radially outward at the transmission element 140 in a fluid-tight manner. The transmission element 140 is coupled to the transmission input shaft 90 so as to be fixed with respect to rotation relative to it by the intermediary of the driven member 44 so that it can be connected in the axial end region in a fluid-tight manner with respect to the outer circumference of the transmission input shaft 90 by a static sealing arrangement, for example, two ring seals. Accordingly, a fluid coupling connection can be produced between the spatial region 144 and a central orifice 148 in the transmission input shaft 90 in a structurally simple manner. Insofar as a relative rotation occurs between the transmission element 142 and the transmission input shaft 90 in a different construction, the fluid-tight coupling would be realized by dynamic sealing elements.

The radial centering of the primary side 60 of the torsional vibration damper 90 is carried out by means of the mating toothed element 132 which is coupled to toothed element 130 and radially centered by the latter. The radial centering of the secondary side 62 of the torsional vibration damper 58 is carried out by means of a radial bearing support 86 on the outer circumference of the driven member 44. The axial position of the torsional vibration damper 58 is predefined by an axial bearing 150 which is supported axially with respect to the driven member and turbine 28, respectively. In the other axial direction, the secondary side 62 is supported with respect to the transmission element 134 by means of a thrust washer or other bearing support. This transmission element 134 is in turn supported by a bearing support 152 axially with respect to transmission element 140. The latter, as was already stated, is fixedly connected to the transmission element 142 which is axially supported with respect to the housing shell 94 by a thrust washer or other bearing support. Further, transmission element 134 and, along with it, also the ring gear 80 are supported radially with respect to the driven member 44 and accordingly also with respect to the transmission input shaft 90 by a bearing support 92.

It is to be noted that the secondary side 62 of the torsional vibration damper 58 could, of course, be axially supported directly with respect to the driven-side ring gear 80. It would also be possible to support the secondary side 62 on ring gear 78.

The transmission element 142 could be formed with internal teeth and then coupled to outer teeth at the driven member 44 which are shaped in a correspondingly complementary fashion. In this case, the transmission element 134 leading to the friction element carrier 136 could be rotatably radially supported on transmission element 142 by the bearing 92. Further transmission element 142 could also fulfill the function of the driven member 44 directly, i.e., could be connected by corresponding teeth to the transmission input shaft 90 so as to be fixed with respect to rotation relative to it. In this case, the turbine 28 or turbine shell 30 thereof would be connected, for example, by a corresponding flange, to this transmission element 142 so as to be fixed with respect to rotation relative to it.

It is to be noted with respect to this embodiment form that the two ring gears 78, 80, which could of course also be formed in one piece, are also held in their axial position in a defined manner by means of the different bearing locations, particularly the axial bearings or different axial supporting rings or retaining rings.

Finally, it is to be noted that in the different embodiment forms described above the variant aspects shown therein can, of course, be combined with one another in any way. For example, in the torsional vibration damping arrangement 42 and oscillation system 66 thereof, a plurality of torsional vibration dampers can act in series and one or more torsional vibration dampers can act in parallel with the latter. This also applies to the further oscillation system 106. It is also possible, of course, that ring gears or, alternatively, also sun gears, can be provided in the various embodiment variants as coupling gears for connecting to the planet gears 72 of the planetary transmission arrangement 68. The teeth 74, 76 of the planet gears 72 can be provided with identical or different diameters, and therefore transmission ratios, corresponding to the respective desirable vibration damping behavior. It is also to be noted that the planet gears 72 as well as the coupling gears, i.e., sun gears or ring gears, engaging therewith can be formed in each instance from a plurality of parts and/or in a segmented manner because, in view of the fact that the relative movement of the primary side with respect to the secondary side in oscillation system 66 is limited, only correspondingly limited relative movements also occur in the region of the planet gears 72 and coupling gears cooperating with the latter.

By integrating a torsional vibration damping arrangement acting or constructed in accordance with the invention into the torque transmission path between a housing and a driven member in a hydrodynamic coupling device, effective measures having a very strong vibration damping effect which contribute to an appreciably increased driving comfort are integrated into a drivetrain in a basically simple construction. The destructive superposition of oscillation components achieved by the phase-shifted superposition of two torque components of the total torque to be transmitted attains in a very compact construction a vibration damping level which could otherwise be achieved only with spring dampers of considerably larger dimensions. Noises in the drivetrain are also substantially reduced by this appreciably improved vibration damping behavior. Due to the appreciably reduced oscillation component in the torque introduced into the drivetrain, it is further possible that the lockup clutch can be closed already at low rotational speed, which permits a more energy-efficient operation of a vehicle.

It is further to be noted that the principles of the invention can of course also be applied when the coupling device is constructed without a stator. In this case, it cannot perform the function of torque conversion so as to increase torque, but rather acts as a fluid coupling or flow coupling.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A hydrodynamic coupling device, comprising:
    a housing arrangement for filing with a fluid;
    an impeller which is rotatable with the housing arrangement around an axis of rotation;
    a turbine which is arranged in the housing arrangement and which is rotatable with a driven member around the axis of rotation;
    a lockup clutch for producing a torque transmission connection between the housing arrangement and the driven member;
    a torsional vibration damping arrangement including an input region and an output region;
    a first torque transmission path provided between the input region and the output region;
    a second torque transmission path parallel to the first torque transmission path and provided between the input region and the output region; and
    a coupling arrangement superposing torques transmitted via the first and second torque transmission paths, wherein the torsional vibration damping arrangement includes a phase shifter arrangement in at least the first torque transmission path, the phase shifter arrangement generating a phase shift of rotational irregularities transmitted via the first torque transmission path relative to rotational irregularities transmitted via the second torque transmission path, wherein the coupling arrangement comprises a planetary transmission arrangement.

2. The hydrodynamic coupling device according to claim 1, wherein the phase shifter arrangement includes a first oscillation system having a primary side and a secondary side which is rotatable relative to the primary side around the axis of rotation against a force of a spring arrangement.

3. The hydrodynamic coupling device according to claim 2, wherein the output region includes a further oscillation system having a primary side and a secondary side which is rotatable relative to the primary side of the further oscillation system against an action of a further spring arrangement.

4. The hydrodynamic coupling device according to claim 3, wherein the turbine is coupled to the primary side of the further oscillation system.

5. The hydrodynamic coupling device according to claim 3, wherein the turbine is coupled to the secondary side of the further oscillation system.

6. The hydrodynamic coupling device according to claim 3, wherein at least one of the first oscillation system and the further oscillation system includes at least two vibration dampers arranged in series with one another and respectively comprise a primary side and a secondary side which is rotatable relative to the primary side.

7. The hydrodynamic coupling device according to claim 3, wherein at least one of the first oscillation system and the further oscillation system includes at least two vibration dampers arranged in parallel with one another and respectively comprise a primary side and a secondary side which is rotatable relative to the primary side.

8. The hydrodynamic coupling device according to claim 3, wherein at least one of the first oscillation system and the further oscillation system comprises a speed-adaptive vibration damping arrangement having at least one deflection mass which can be deflected in a circumferential direction from a basic position and which in so doing changes a distance from the axis of rotation.

9. The hydrodynamic coupling device according to claim 3, wherein at least one of the first oscillation system and the further oscillation system includes a fixed-frequency vibration damping arrangement having at least one oscillation mass which can be deflected against an action of a return spring arrangement.

10. The hydrodynamic coupling device according to claim 3, further comprising:
    a friction damping arrangement associated with at least one of the first oscillation system and the further oscillation system, the friction damping arrangement opposing a relative rotation between the primary side and the secondary side of at least one of the first oscillation system and the further oscillation system.

11. The hydrodynamic coupling device according of claim 1, wherein the turbine is coupled to the output region.

12. The hydrodynamic coupling device according to claim 1, wherein the lockup clutch is operatively arranged in one of the first and second torque transmission paths.

13. The hydrodynamic coupling device according to claim 1, wherein the lockup clutch is operatively arranged in the output region.

14. The hydrodynamic coupling device according to claim 1, wherein the lockup clutch is operatively arranged in the input region.

15. The hydrodynamic coupling device according to claim 1, wherein the planetary transmission arrangement includes a planet gear carrier which is connected to the second torque transmission path and which has a plurality of planet gears rotatably supported thereon.

16. The hydrodynamic coupling device according to claim 15, wherein the planetary transmission arrangement includes:
    a first coupling gear arrangement in meshing engagement with the planet gears and connected to the first torque transmission path, and
    a second coupling gear arrangement in meshing engagement with the planet gears and connected to the output region.

17. The hydrodynamic coupling device according to claim 16, wherein the first coupling gear arrangement in meshing engagement with the planet gears and the second coupling gear arrangement in meshing engagement with the planet gears provide transmission ratios that are identical to one another.

18. The hydrodynamic coupling device according to claim 16, wherein the first coupling gear arrangement in meshing engagement with the planet gears and the second coupling gear arrangement in meshing engagement with the planet gears provide transmission ratios that differ from one another.

19. The hydrodynamic coupling device according to claim 16, wherein each one of the first coupling gear arrangement and the second coupling gear arrangement includes a respective ring gear arrangement.

20. The hydrodynamic coupling device according to claim 16, wherein each one of the first coupling gear arrangement and the second coupling gear arrangement includes a respective sun gear arrangement.

\* \* \* \* \*